Figure 1:
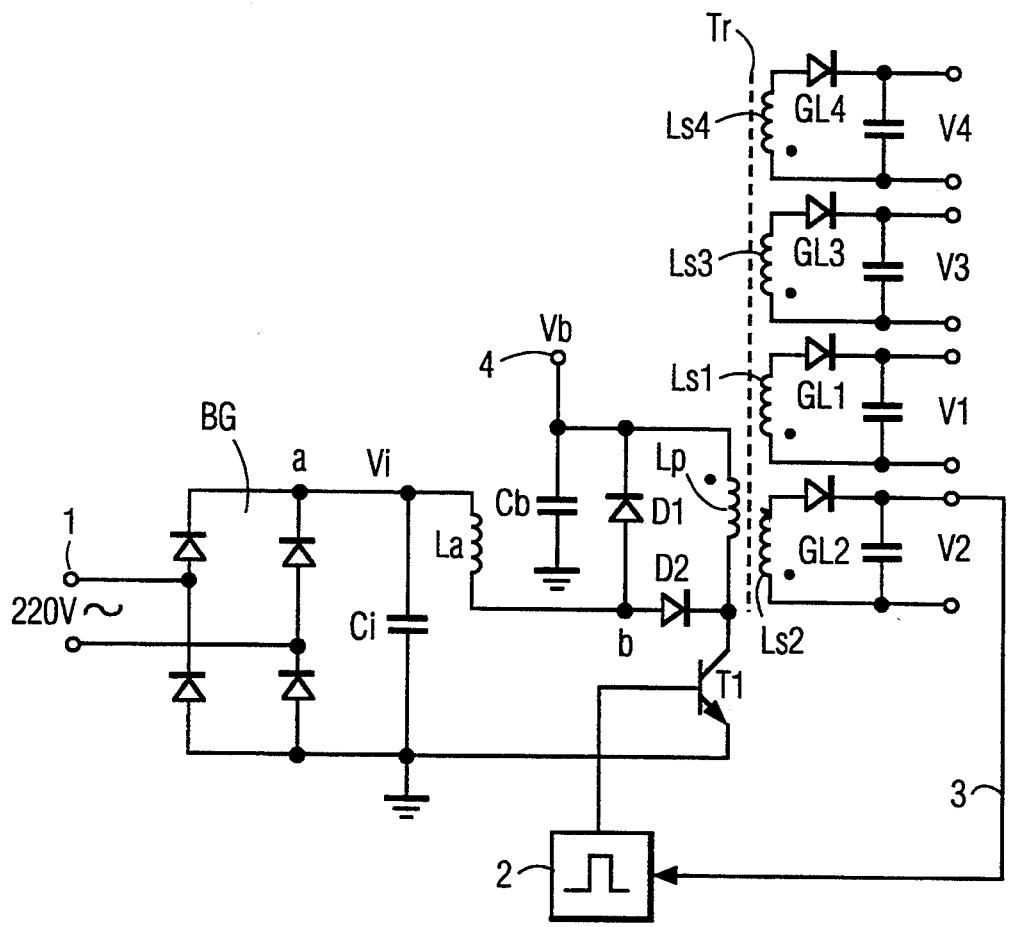

United States Patent [19]

Rilly et al.

[11] Patent Number: 5,390,099
[45] Date of Patent: Feb. 14, 1995

[54] LINE-POWERED, PHASE-CONTROL CIRCUIT

[75] Inventors: Gerard Rilly, Unterkirnach; Gerhard Morizot, Villingen, both of Germany

[73] Assignee: Deutsche Thomson-Brandt GmbH, Villingen-Schwenningen, Germany

[21] Appl. No.: 43,878

[22] Filed: Apr. 7, 1993

[30] Foreign Application Priority Data

Aug. 10, 1990 [DE] Germany ............... 4025322

[51] Int. Cl.$^6$ ................................. H02M 3/335
[52] U.S. Cl. ..................... 363/16; 363/131; 323/222
[58] Field of Search ............ 323/222, 282, 351; 363/15, 16, 20, 21, 97, 131

[56] References Cited

U.S. PATENT DOCUMENTS

| 4,109,307 | 8/1978 | Knoll | 363/21 |
| 4,302,717 | 11/1981 | Olla | 323/282 |
| 4,315,305 | 2/1982 | Siemon | 363/88 |
| 4,486,823 | 12/1984 | Palm | 363/21 |
| 4,530,043 | 7/1985 | Palm et al. | 323/222 |
| 4,564,897 | 1/1986 | Okamoto et al. | 363/132 |
| 4,652,809 | 3/1987 | Barn | 323/282 |
| 4,772,810 | 9/1988 | Felps | 363/20 |
| 4,947,308 | 8/1990 | Gulezynski | 363/97 |

FOREIGN PATENT DOCUMENTS

| 2472297 | 6/1981 | France | H02M 7/02 |
| 3622986 | 1/1988 | Germany | H02M 3/28 |
| 58-141680 | 8/1983 | Japan | H02M 3/28 |

OTHER PUBLICATIONS

IEEE Translations On Aerospace And Electronic Systems, vol. 24, No. 6 Nov. 1988, New York, pp. 800–807 Galateanu, "Buck–Flyback DC-DC Converter."
Patent Abstracts Of Japan, vol. 7, No. 247 (E-208) (1932) Nov. 2, 1983.
A publication by Siemens Semiconductor, Industrial ICs, dated Dec. 15, 1989 illustrating a switch mode power supply that includes a transistor T.
A publication entitled Power Supply Controls published by Unitrode Integrated Circuit, Jul. 1990.

Primary Examiner—Jeffrey L. Sterrett
Attorney, Agent, or Firm—Joseph S. Tripoli; Joseph J. Laks; Sammy S. Henig

[57] ABSTRACT

A line-powered phase-control circuit includes a source of rectified voltage. An inductance is responsive to the rectified voltage. A switching transistor has a conduction path connected in series with the inductance at a junction. One plate of a charging capacitor is connected to the inductance and the rectified voltage charges the charging capacitor through a first diode. A switch mode power supply includes a transformer having a primary winding connected between the junction and the plate of the charging capacitor. A second diode is connected between the inductance and the junction.

5 Claims, 1 Drawing Sheet

LINE-POWERED, PHASE-CONTROL CIRCUIT

This is a continuation of PCT application PCT/EP 91/01448, filed Aug. 1, 1991 by Gerard Rilly and Gerhard Morizot and titled "Line-Powered, Phase-Control Circuit".

The invention is directed to a line-powered phase-control circuit. In a known circuit of this type, a serial connection of an inductance and a transistor, which acts as a switch, is connected to the output of a power line rectifier. The junction of the serial connection is connected to a charging capacitor by a diode. The charging capacitor supplies the operating voltage, which is stabilized by a line-powered phase-control circuit. Such a phase-control circuit is advantageous because the switch operation causes the power dissipation within the circuit to be low, and the operating voltage generated can be varied within wide limits by changing the phase operating angle. The known circuit described is also designated as a "step-up" circuit. Such a circuit is describe din "IEEE TRANSACTIONS ON AEROSPACE AND ELECTRONICS SYSTEMS", Vol. 2, NO. 6, November 1988, New York, pages 800 through 807.

Such circuits with phase control generate harmonic waves in the current drawn from the main power supply, such harmonic waves are undesirable because they can cause interference. Therefore, there are requirements regarding the maximum amplitude of the harmonic waves in the current drawn from the power line. According to the latest requirements, the maximum permissible amplitude of the harmonic waves depends on the power drawn from the power line in the power range below 300 W.

It is an object of the invention to further develop the known circuit described without any great additional expense and in such a way that the amplitude of the harmonic waves in the current drawn from the power line is reduced.

The circuit according to the invention is an advantageous and, as far as circuitry is concerned, simple combination of the known "step-up" circuit and a switch mode power supply. With the invention, the transistor which serves as a switch fulfills two tasks simultaneously. First, the transistor serves as a switch for the known step-up circuit. In addition, the transistor serves as an electronic power switch for the switch mode power supply combined with the step-up circuit. Consequently, the same switch, in the form of a transistor, is used for both functions effective in the overall circuit.

Figure 2:
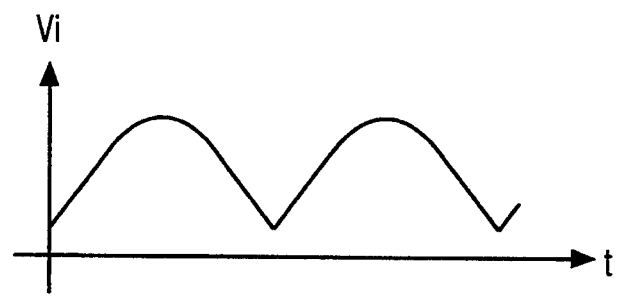

The invention is described with reference to the FIGURES, in which:

FIG. 1 is a preferred embodiment; and
FIG. 2 shows the progression of a voltage occurring in the circuit of FIG. 1.

The symbols used in the description of the drawing are defined as follows:
Ci = capacitor with low capacitance of approximately 5 $\mu$F, for example,
Cb = electrolytic capacitor with high capacitance of approximately 150 $\mu$F, for example,
La = inductance of approximately 1 mH, for example,
D1 = diode of type BYT 13-600, for example
D2 = diode of type BYT 13-600, for example
T1 = power transistor of type BUV 56 serving as a switch, for example
td = conducting time of diode D2,
ton = conducting time of T1,
Imain = current drawn from power line,
Umain = power line voltage In FIG. 1, a power line bridge connected rectifier BG is connected to the power line terminals 1. A capacitor Ci is connected to the output terminal 'a'. Capacitor Ci has a relatively low capacitance of 5 $\mu$F, for example, and is used for RF suppression and does not cause any significant filtering for the main voltage of 50 Hz. Connected to output terminal 'a' is an inductance La, the other end of which is connected via a diode D1 to a charging capacitor Cb. Capacitor Cb is an electrolytic capacitor with a high capacitance of approximately 150 $\mu$F. The junction 'b' of the serial connection inductor LA and diode D1 is connected by a diode D2 to the collector of a transistor T1. In addition, the collector of transistor T1 is connected by the primary winding Lp of a transformer Tr to a charging capacitor Cb. Transistor T1 and inductor Lp form a switch mode power supply. The transformer Tr contains two secondary windings Ls1 and Ls2 which supply two operating direct voltages V1, V2 via rectifiers GL1 and GL2.

The transistor T1 is controlled by a control circuit 2 in the sense of a phase control, to be periodically conducting and nonconducting. The control circuit 2 is synchronized by the main voltage via line 3. The transistor T1 serves as a switch for the known step-up circuit which would contain only the components inductor La, transistor T1, diode D1 and capacitor Cb. In addition, the transistor T1 functions as an electronic power switch of the switch mode power supply, with the switch mode power supply transformer Tr, combined with the step-up circuit.

During the conducting time of the transistor T1, the inductance La stores an amount of energy proportional to the square of the input voltage. This energy is transmitted via the diode D1 to the charging capacitor Cb. The charging capacitor Cb has a capacitance which is so high that it evens out the output voltage of the rectifier BG, so that a pure direct voltage results at the terminal 4.

The voltage Vb is greater than the peak voltage of the main power rectifier and depends on the conducting time of the transistor T1. The following applies:

$$Vb = Vi*(ton+td)/td.$$

The capacitor Cb, the transformer Tr and the transistor T1 form a switch mode power supply with reverse rectifying. In the normal stationary operation, the conducting time 'ton' of the transistor T1 changes slowly according to the charge in the secondary windings. However, the time 'ton' is essentially constant during one-half of a period and depends on the power transmitted. The inductance La must be sized sufficiently small, in fact in such a way that it can be completely discharged during the blocking time of the transistor T1. Consequently, the current through the inductance La is very nearly linearly dependent on the time 'ton', i.e. on the power which is transmitted via the transformer Tr. On the other hand, the time 'ton' is essentially constant during one-half of a phase-angle period. Therefore, the average current flowing through the inductance La is approximately proportional to the voltage Vi.

The capacitor Ci is sized so small that it merely causes filtering effect for high frequencies. Accordingly, the voltage Vi is roughly equal to the rectified main voltage, i.e. represents a so-called pulsed direct voltage as shown in FIG. 1. Therefore, the current through the inductance La is essentially equal to the current supplied by the rectifier BG and, hence more or less of sine-wave shape. If the operating frequency of the transistor T1 is fixed and the switch-on time 'ton' is constant, then the current supplied by the rectifier BG is, theoretically, not totally of sine-wave shape. Rather, the current contains harmonics, the amplitudes of which are relatively small and lie within the permissible tolerances.

FIG. 2 shows that the voltage Vi at the capacitor Ci is, practically, unfiltered by a correspondingly small capacitor Ci, i.e. represents a so-called pulsed direct voltage consisting of half sine waves. The relatively small capacitor Ci only serves to suppress RF voltages. It works together with the inductance La as a low pass and prevents RF voltages from entering the power line. The small capacitor Ci also contributes to keeping the amplitudes of the harmonics of the current drawn form the power line low. Also, a smaller capacitor is cheaper than an electrolytic capacitor with a high capacitance of approximately 100$\mu$F which would otherwise be used as a charging capacitor.

It is essential that the switch mode power supply functions with the transistor T1 and the transformer Tr according to the principle of the blocking oscillator with reverse rectifying. This means that the rectifiers GL are then conducting and energy is transferred into the capacitors when the transistor T1 is blocked. The reverse rectifying is achieved through polarizing the secondary windings Ls and the connected rectifiers GL in a certain manner. The polarization of the windings for reverse rectifying is indicated in FIG. 1 by the points on the individual windings.

In order to generate further secondary voltages V3 and V4, the transformer Tr contains two further rectifiers GL3 and GL4 which are fed from further secondary windings Ls3 and Ls4. Another advantage of the circuit is that the voltage at the capacitor Cb can vary over wide limits from approximately 50 percent to 100 percent.

We claim:

1. A line-powered power supply circuit, comprising:
    a source of an AC, mains supply voltage;
    an inductance;
    a rectifier coupled to said mains source for rectifying said mains supply voltage to develop a rectified supply voltage in said inductance without significant low pass filtering with respect to a frequency of said mains supply voltage;
    a switching transistor operating at a switching frequency that is higher than that of said main supply voltage coupled in series with said inductance for generating current pulses in said inductance having magnitudes that vary significantly during a period of said mains supply voltage in a manner to increase a power factor associated with said mains source;
    a charging capacitor;
    a first diode coupled to said charging capacitor and to a junction terminal between said inductance and said transistor for coupling a charging current to said capacitor that is produced in said inductance from said current pulses;
    a transformer having a primary winding that is coupled to said charging capacitor and to said transistor to form a switch mode power supply operating in a flyback manner; and
    a second diode coupled to said junction terminal and to said transistor and poled to conduct in a direction of a main current path in said transistor for coupling said transistor to said inductance to generate said current pulses and for decoupling said inductance from said primary winding when said charging current is coupled to said capacitor.

2. The circuit of claim 1 wherein said inductance has a lower value than the inductance of said primary winding.

3. The circuit of claim 2 further including an RF suppression capacitor responsive to said rectified supply voltage.

4. The circuit of claim 1 further including an RF suppression capacitor responsive to said rectified supply voltage.

5. The circuit of claim 1 wherein said transformer includes at least one secondary winding providing a rectified output voltage and further including a control circuit for controlling said switching transistor in response to said output voltage.

* * * * *